United States Patent [19]
Grant

[11] Patent Number: 5,492,181
[45] Date of Patent: Feb. 20, 1996

[54] APPARATUS FOR CUTTING SQUARE GRASS PLUGS

[76] Inventor: Robert F. Grant, 8583 Mockingbird La., Seminole, Fla. 34647

[21] Appl. No.: 323,852

[22] Filed: Oct. 17, 1994

[51] Int. Cl.⁶ ................................................. A01B 45/02
[52] U.S. Cl. ............................ 172/22; 111/101; 172/19
[58] Field of Search ..................... 172/19–22; 111/106, 111/92, 99, 101; 37/302; 175/20, 18

[56] References Cited

U.S. PATENT DOCUMENTS

| | | | |
|---|---|---|---|
| 1,692,436 | 11/1928 | Deane | 111/101 |
| 2,531,297 | 11/1950 | Rose | 172/22 X |
| 2,618,500 | 11/1952 | Peach | 111/10 |
| 3,444,938 | 5/1969 | Ballmann | 172/22 |
| 3,951,212 | 4/1976 | Hallman | 172/19 |
| 4,966,238 | 10/1990 | Shields | 172/19 |
| 4,974,682 | 12/1990 | Hoffman | 172/22 |

*Primary Examiner*—Terry Lee Melius
*Assistant Examiner*—Spencer Wail

[57] ABSTRACT

The sod cutting device described herein comprises a hollow sod-receiving four-sided receptacle open at the bottom and at least partially closed at the top. The receptacle has a square cross-section parallel to the bottom of the receptacle and the walls of the receptacle have knife-sharp lower edges. The top portion of this receptacle has an opening through which the lower end of a shaft is allowed to enter the receptacle. At the lower end of this shaft there is affixed perpendicularly a sod-pushing plate which is shaped and dimensioned to cover a substantial portion of the cross-section of the receptacle. The shaft is enclosed in a hollow cylindrical sleeve which is affixed at the bottom to the top portion of the sod-receiving receptacle and at its top to a handle which has an opening therein through which the top end of the shaft extends. A coil spring is positioned around the shaft, that is between the shaft and the inside of the sleeve. A collar is affixed to the shaft and positioned to hold the spring in a compressed condition when the chamber is filled with sod, at which time a catch or locking device holds the shaft in that position, and when the catch or lock is released, the spring pushes the collar and shaft downward to push the sod out from the receptacle.

2 Claims, 3 Drawing Sheets

APPARATUS FOR CUTTING SQUARE GRASS PLUGS

BACKGROUND

1. Field of the Invention

This invention relates to a device which facilitates the cutting of sod into rectangular, preferably square shapes for transplanting. More specifically it relates to a device which cuts, picks up the square piece of sod and deposits it in a desired location.

2. Background of the Invention

In a nursery, the production of small plugs or squares of sod are produced by planting seed on soil contained in small square cups having top dimensions generally about 3"×3". The resultant small plugs of grass are generally planted with the spaces between plugs eventually being filled with spreading growth of the grass.

In a study of the patent prior art the only pertinent patent found was D. R. Tuggle U.S. Pat. No. 3,163,455. However the device described in this patent relies on a handle outside the main part of the device for manually pushing out the plug of grass. This contrasts with the invention described herein which is spring loaded and merely requires release of spring pressure to dislodge the cut plug of sod.

Objectives

It is an object of this invention to design a device which facilitates the cutting of small plugs or squares of sod.

It is also an object of this invention to design a spring-loading device which facilitates the unloading of the cut plug of sod by release of spring pressure.

Other objects will become apparent upon reading the description of this invention which follows.

SUMMARY OF THE INVENTION

In accordance with the present invention, a sod-cutting device designed to cut grass sod into squares of desired dimensions, preferably having dimensions of about 3"×3", consists of a shaft which has its lower end passing into a receptacle having inside dimensions corresponding to the dimensions desired in the size of the plug of sod to be cut. The receptacle is open at the lower end, with the bottom edges of the sidewalls of the receptacle being knife-sharp. The receptacle has a top portion with an opening through which the lower portion of the shaft is passed. The lower end of the shaft is attached perpendicularly to a flat plate which has its dimensions shorter than the interior dimensions of the receptacle so that the plate can move upward or downward within the receptacle as the shaft is moved upward or downward through the opening. The receptacle may be described as having four sides of similar dimensions, each side having a top edge and a bottom edge, one pair of sides being parallel and opposite to each other, the other pair of sides also being parallel and opposite to each other, each side being adjacent to two other sides and perpendicularly attached to the two sides adjacent thereto. The bottom edge of each side is knife-sharp so as together to form a sharp-edged square. This sharp-edged square serves as a sod-cutting utensil.

A plate which serves as the receptacle's top portion is affixed directly or indirectly to a cylindrical sleeve which embraces or surrounds the shaft. Surrounding the upper part of the shaft and inside the sleeve, there is positioned a coil spring which rests on a first collar welded or otherwise fixed to the shaft at an appropriate position. A second collar is welded or otherwise affixed to the shaft at an appropriate lower position to limit the downward movement of the shaft. The distance between the uppermost and lowermost positions of this second collar, as the shaft moves upward and downward, corresponds to the distance that the plate inside the receptacle travels in its uppermost and lowermost positions.

Preferably there are two fittings between the shaft and the sleeve. A first fitting is attached to the top portion of the receptacle and provides a centering means between the sleeve and the shaft as the shaft moves upward and downward. A second fitting is inserted is at the top of the sleeve and fitted tightly against the sleeve preferably with tightening means to assure this fixed position. The upper part of the shaft moves upward and downward in the interior of this second fitting. The upper end of the shaft is equipped with a catch means so that the shaft may be locked in position when the coil spring is in a compressed condition, generally when a plug of sod is contained in the cutting receptacle. When it is desired to release or push out the sod, the catch means is released and the action of the spring release pushes the shaft downward to expel the piece of sod from the receptacle.

A handle is provided at the top of the device so that the operator may hold the device in an upright position while in use. This handle may comprise a bar or a long, narrow rectangular plate affixed at the top of the second fitting. The bar or plate should be of sufficient strength to withstand the pressure to which it will be exposed. A convenient bar is one of steel 9"×1.5"×0.25".

While the operator may apply sod cutting force by pushing his foot downward on the roof of the cutting receptacle, it is preferable to have the flat plate roof portion extend beyond the receptacle. This may be separate from and on top of the roof portion or may be an integral part such as an extension of the roof portion. Again this may be a bar of adequate strength such as a steel bar having 9"×1.5"×0.25". However the handle and the foot plate bar may be of various dimensions and strengths to serve their purpose.

The description of the invention is facilitated by reference to the drawings.

DETAILED DESCRIPTION

Figure 1:
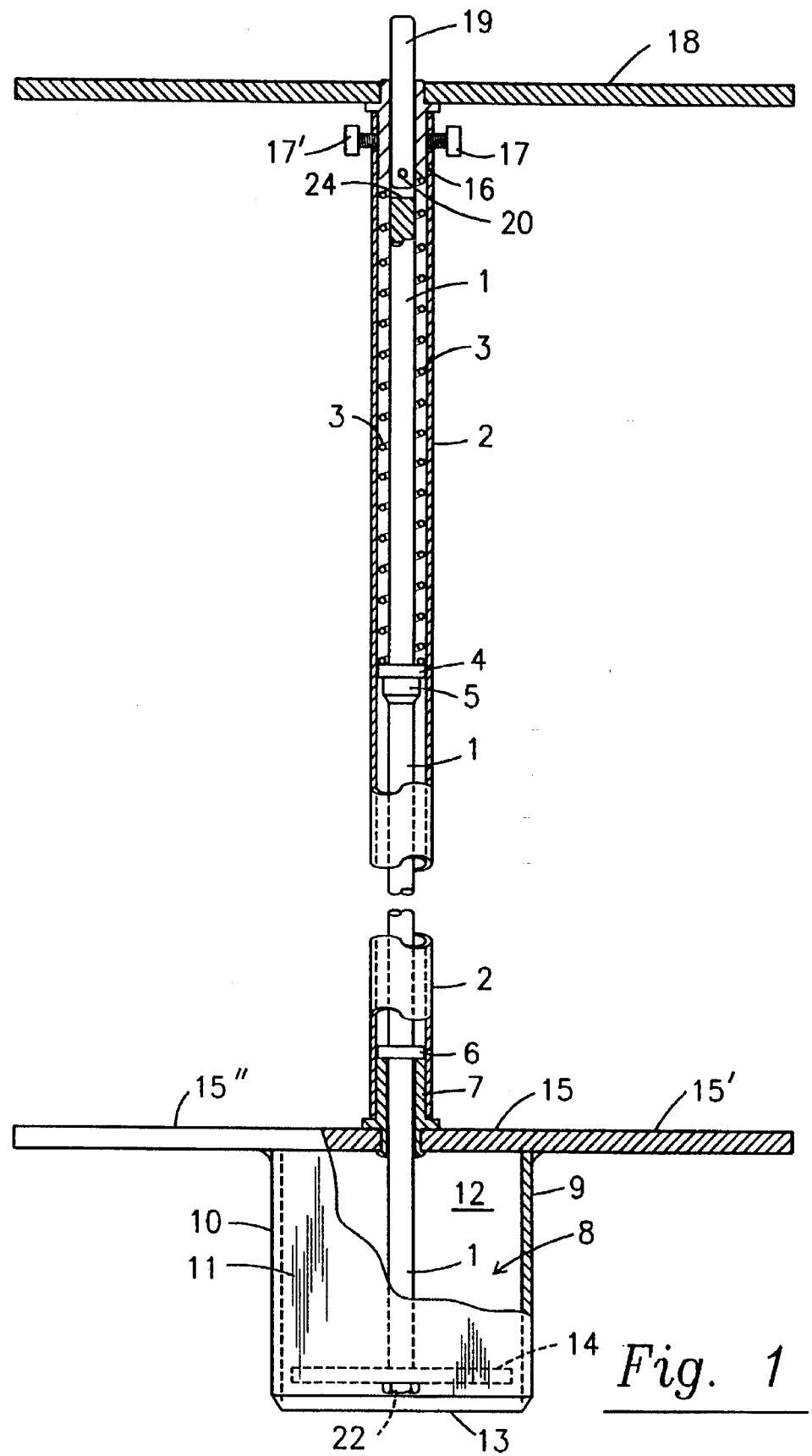
FIG. 1 is a front elevational view of the device of this invention with the shaft in a lowered position and with partial cross-sectional views shown, and also with an abbreviated portion.
Figure 2:
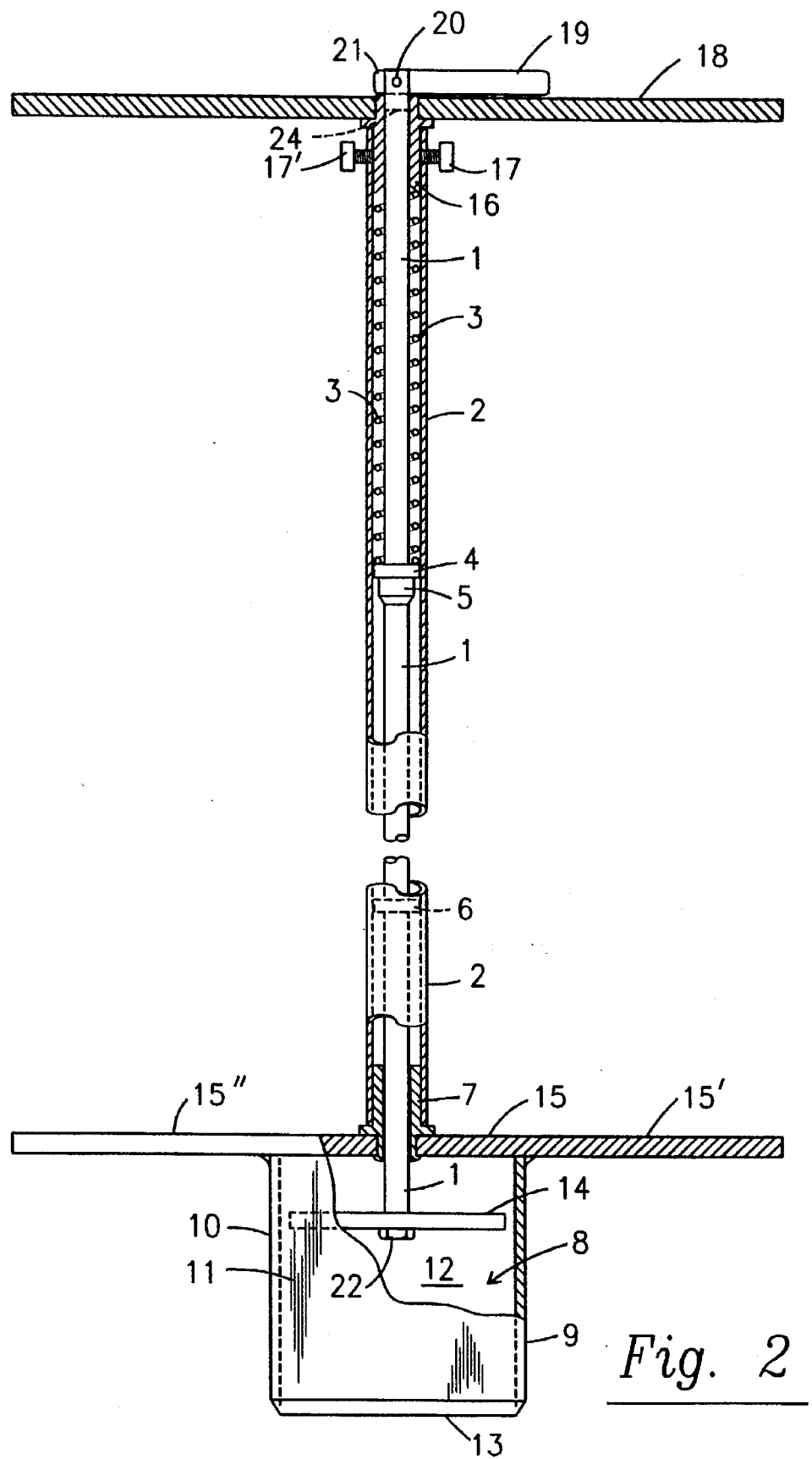
FIG. 2 is similar front elevational view of the device of FIG. 1 with the shaft in its raised locked position and the coil spring in compressed condition.

In FIGS. 1 and 2, shaft 1 extends through substantially the entire length of the device of this invention. Sleeve 2 embraces shaft 1 as well as coil spring 3. In FIG. 1 this spring 3 is in a relaxed or non-compressed condition whereas in FIG. 2 the spring 3 is in a compressed condition. First collar 4 is affixed to shaft 1 either directly, or indirectly by the sub collar 5 which is welded or otherwise fixed to shaft 1, Second collar 6 is affixed to a lower position on shaft 1. This second collar 6, affixed to shaft 1, prevents shaft 1 from going below a desired position by virtue of lower fitting 7 which centers shaft 1 and fills the space between shaft 1 and sleeve 2. Shaft 1 is loose enough in fitting 7 to facilitate upward and downward movement of shaft 1. The lower end of shaft 1 extends downward through an opening in the roof portion 15 of receptacle 8 which has side walls 9 and 10, front wall 11, and back wall 12. The bottom edge of each of the walls is knife-edge sharp suitable for cutting sod. To the lower extremity of shaft 1 there is connected a pusher plate 14 for removing the cut piece of sod contained in receptacle 8. Nut 22 holds plate 14 onto threaded end of shaft 1. With the sod contained in receptacle 8 this plate 14 will be in the position shown in FIG. 2. When shaft 1 is moved downward to move plate 14 to the position shown in FIG. 1, the piece of sod will be pushed downward and expelled from receptacle 8. Plates 15' and 15" are extensions of roof portion 15 which may be useful in exerting a downward thrust on the receptacle 8 (or box 8 as described hereinafter) during the sod cutting operation.

At the upper end of shaft 1, fitting 16 keeps shaft 1 centered and fills the space between shaft 1 and sleeve 2. Threaded bolts 17 and 17' insure a secure positioning of fitting 16. Handle 18 enables the operator to hold the equipment in an upright position during the sod cutting and releasing operations and facilitates transporting the equipment from one location to another location. To the upper end of shaft 1 there is connected lever arm 19 which is inserted in slot 24 cut into the end of shaft 1 which lever arm is swivelly connected to shaft 1 by means of pin 20. Advantageously pin 20 is positioned off center on lever arm 19 to facilitate lever arm 19 falling to a horizontal position, as shown in FIG. 2, when shaft 1 is raised to its highest position. If the lever arm does not fall by itself to a horizontal position, this may be effected by movement with a thumb or finger of the operator. In the horizontal position, catch 21 prevents the downward movement of shaft 1. This is the position maintained while sod is in receptacle 8 (or box 8). When it is desired to release or dislodge the sod from receptacle 8 (or box 8), the operator will move lever arm 19 to a vertical position to put catch 21 in alignment with shaft 1 and spring 3 is thereby released to force shaft 1 downward causing plate 14 to push the sod out of receptacle 8 (or box 8). Various other types of catching means may be used in place of the one shown here.

Figure 3:
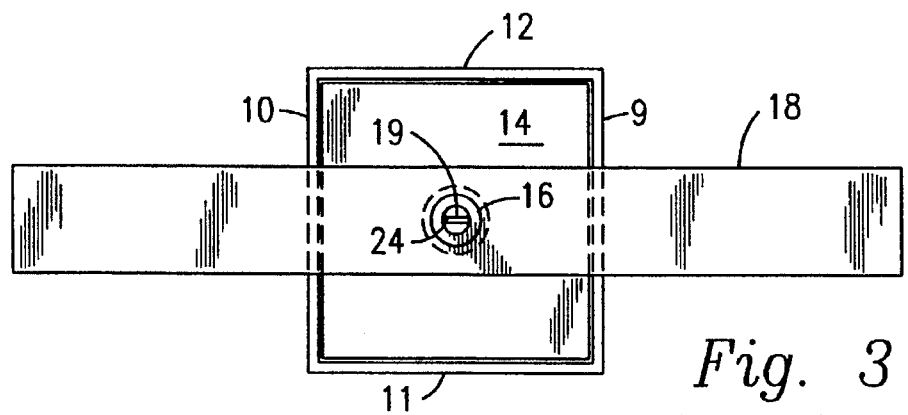
FIG. 3 is a top plan view of the device of FIG. 1.

FIG. 3 shows a top view of the apparatus as in FIG. 1 with the lever arm 19 partially drawn into fitting 16.

Figure 4:
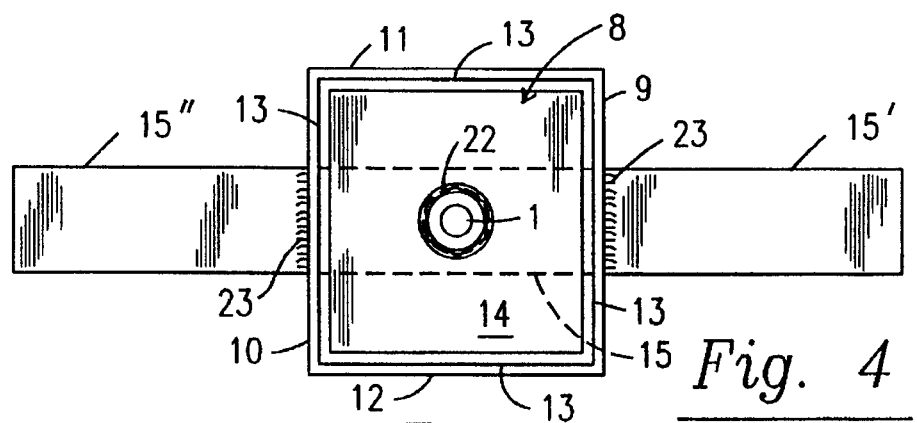
FIG. 4 is a bottom plan view of the device of FIG.

FIG. 4 shows the bottom of the square receptacle 8 with sharp edge 13. Plate 14 is fastened to shaft 1 by nut 22. Weld junctions 23 affix the extensions 15' and 15" to the top portion of receptacle 8.

Figure 5:
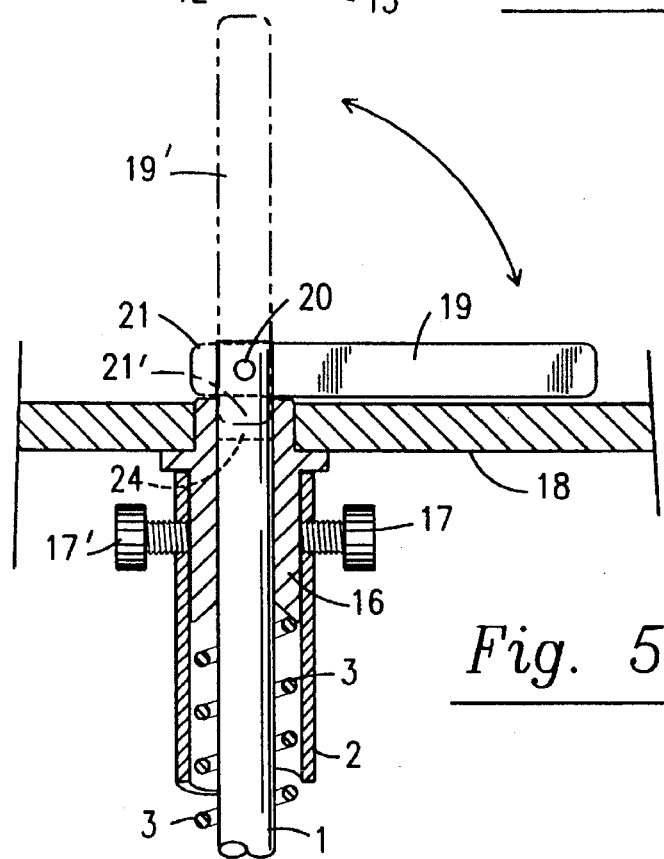
FIG. 5 is a partial front elevational cross-sectional view of the upper portion of the device shown in FIG. 2.

In FIG. 5 the upper portion of the device is shown in cross-section with lever arm 19 in horizontal position and catch 21 in locked position to prevent downward movement of shaft 1. In phantom, lever arm 19' is shown raised to a vertical position and catch 21' to an unlocking position so that spring 3 can be released to force the sod out from the receptacle. The top end of shaft 1 has a slot 24 cut to accommodate the insertion of lever arm 19. Lever arm 19 has a thickness small enough to fit into this slot 24 and has a width no greater than the diameter of shaft 1 so that when lever arm 19 is raised to the position 19' (shown in phantom), the lever arm 19 can fit into the inside of fitting 16 as shaft 1 is moved downward. The slot 24 is cut deep enough in shaft 1 to accommodate the movement of catch 21 (which is one end of lever arm 19) into slot 24.

The description given above of the receptacle may be simplified by referring to it as a box 8 with the bottom removed. The definitions and limitations applied to "receptacle" also apply to "box". A top may be present on the box or may be omitted. If a top is present, it may be considered as the cross-bar with or without extensions as described above. Foot pressure may be exerted on such a top or on an extension of said top or on a cross-bar positioned on top of said top. The side walls of the box are identical in dimensions so that the combination of bottom edge will provide the desired square. It is intended that the preceding variations pertaining to the presence of a top are embraced and covered when reference is made to the cross-bar which reaches across the top of two of the parallel walls of the box or receptacle. The bottom edge of each sidewall of the box is sharpened to a cutting edge and crossbar 15 may be welded or otherwise affixed to the top edges of two opposite walls of the box with extensions 15' and 15" extending beyond the box walls. Crossbar 15 is positioned in the middle of each of the two sidewalls on which it rests. Crossbar 15 has an opening to accommodate passage of shaft 1 and has a sufficient width to have the bottom edge of sleeve 2 resting completely thereon and affixed thereto. The Crossbar 15 may be of any convenient shape or size provided it has the strength to withstand the pressure exerted.

While other shapes of sod such as other rectangular shapes, circular, triangular, etc., can also be cut by corresponding changes in the shape of the cutting edges of the receptacle or box 8, the square shape has been described since it is the most practical and most likely to be used. Moreover the dimensions of the piece of cut sod may be varied as desired by appropriate selection of the cutting edge square.

Other types of handles may be used in place of bar 18 type shown in the drawings to hold the device upright while in use. The bar has the advantage that the operator may use both of his hands to hold the device. Also various other types of catching or locking means may be used in place of the lever arm type shown in the drawings.

While the apparatus of this invention is designed for cutting plugs of grass, it is also contemplated that it may be used to make holes for transplanting purposes by removing soil from a particular spot in which a plant is to be deposited.

In view of the strength requirements for the device of this invention the parts are preferably made of metal. However, hard, durable plastics may be used in certain portions. Also, while various types of handles and cross-bars may be used, those shown in the drawings are of an advantageous type. These are conveniently flat steel bars having a length of about 9 inches, a width of about 1.5 inches and a thickness of about 25 inches. Obviously considerable variations from these dimensions are also suitable.

Therefore features of this while certain invention have been described with respect to in detail preferred embodiments thereof, it will of course be apparent that other modifications can be made within the spirit and scope of this invention.

The invention claimed is:

1. A sod-cutting device comprising:

(a) a bottom-less receptacle having four rectangular sides of equal size, each side having four edges including two side edges, a top edge and a bottom edge, each side edge being perpendicularly attached to a side edge of an adjacent side and each side being parallel and opposite to another side, each bottom edge being sharpened to a cutting edge whereby said bottom edges form a composite square cutting edge;

(b) a cross-bar affixed to the top edges of two opposite sides of said receptacle, said cross-bar having an opening located above the center of said receptacle;

(c) a first fitting connected within the opening of said cross bar, said first fitting having an aperture;

(d) a shaft extending upwardly through and slidably received within the aperture of said first fitting, said shaft having a top and bottom end;

(e) a sleeve attached to the first fitting, said sleeve being concentric with the shaft, said sleeve having a top and bottom end;

(f) a flat plate connected perpendicularly to the lower end of said shaft within the receptacle and having dimensions slightly smaller than the receptacle so that said plate moves freely within the receptacle when moved by the shaft;

(g) a first stopping means on said shaft for preventing the movement of said shaft to a position where the flat plate extends beyond the cutting edges of the receptacle;

(h) a second fitting connected to the top end of said sleeve, said second fitting having an aperture into which said shaft extends;

(i) a coil spring positioned around said shaft within the sleeve;

(i) a second stopping means connected to the shaft intermediate the shaft top and bottom ends, said second stopping means compressing said spring against said second fitting when said flat plate is near the top edges of said receptacle and allowing said coil spring to expand to move the flat plate near the cutting edges of the receptacle;

(j) a handle means extending perpendicular on the top end of the sleeve for applying downpressure to the device; and (k) a catch means at the top end of said sleeve to lock the shaft in a desired position.

2. The sod cutting device of claim 1, in which said shaft has a slot cut in its top end, said catch means including a flat lever arm pivotally attached to said shaft within said slot, wherein said lever arm is partially drawn into the top end of said sleeve vacated by said shaft when said shaft moves toward said receptacle and is pushed out of the top end of said sleeve when said shaft moves away from the receptacle, when said lever arm is pushed out of the top end of the sleeve it may be pivoted to a perpendicular position to said shaft to prevent retraction of said shaft into the top end of said sleeve.

* * * * *